United States Patent
Thenappan et al.

(10) Patent No.: US 9,969,899 B2
(45) Date of Patent: May 15, 2018

(54) FLUOROPOLYMERS CONTAINING A COPOLYMERIZED FLUOROMONOMER AND A FUNCTIONAL HYDROCARBON COMONOMER AND ARTICLES MADE FROM SUCH FLUOROPOLYMERS

(71) Applicants: Honeywell International Inc., Morristown, NJ (US); Centre National De La Recherche Scientifique, Paris (FR)

(72) Inventors: Alagappan Thenappan, Hackettstown, NJ (US); Bruno Ameduri, Montpellier (FR); Gerald Lopez, Lunel-Viel (FR); Eric Rainal, Morristown, NJ (US); Noureddine Ajellal, Montpellier (FR); Gary Martin, Piscataway, NJ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 356 days.

(21) Appl. No.: 14/177,784

(22) Filed: Feb. 11, 2014

(65) Prior Publication Data

US 2014/0234630 A1   Aug. 21, 2014

Related U.S. Application Data

(60) Provisional application No. 61/765,964, filed on Feb. 18, 2013.

(51) Int. Cl.
| | |
|---|---|
| C09D 127/12 | (2006.01) |
| B32B 27/08 | (2006.01) |
| C08J 7/04 | (2006.01) |
| B32B 27/30 | (2006.01) |
| B32B 27/32 | (2006.01) |
| B32B 27/36 | (2006.01) |
| C08F 214/18 | (2006.01) |
| C08J 5/18 | (2006.01) |

(52) U.S. Cl.
CPC ............ *C09D 127/12* (2013.01); *B32B 27/08* (2013.01); *B32B 27/304* (2013.01); *B32B 27/308* (2013.01); *B32B 27/322* (2013.01); *B32B 27/36* (2013.01); *C08F 214/18* (2013.01); *C08J 5/18* (2013.01); *C08J 7/047* (2013.01); *B32B 2307/412* (2013.01); *B32B 2307/714* (2013.01); *B32B 2307/7265* (2013.01); *B32B 2439/00* (2013.01); *B32B 2439/80* (2013.01); *B32B 2581/00* (2013.01); *B32B 2597/00* (2013.01); *C08J 2327/06* (2013.01); *C08J 2327/12* (2013.01); *C08J 2367/02* (2013.01); *C08J 2379/08* (2013.01); *C08J 2427/04* (2013.01); *C08J 2427/12* (2013.01); *Y10T 428/31507* (2015.04); *Y10T 428/31544* (2015.04)

(58) Field of Classification Search
None
See application file for complete search history.

(56) References Cited

U.S. PATENT DOCUMENTS

| | | | |
|---|---|---|---|
| 2,779,025 A | 1/1957 | Perry | |
| 4,039,734 A * | 8/1977 | Hendy | B01J 19/0006 264/290.2 |
| 4,151,340 A | 4/1979 | Ichimura et al. | |
| 5,283,304 A | 2/1994 | Nakabayashi et al. | |
| 5,346,939 A * | 9/1994 | Moren | C08K 5/0091 524/174 |
| 5,578,689 A | 11/1996 | Nogues et al. | |
| 5,880,204 A * | 3/1999 | McCarthy | C08F 214/245 524/504 |
| 6,342,569 B1 * | 1/2002 | Manzoni | C08F 214/245 526/249 |
| 63,242,569 | 1/2002 | Manzoni | |
| 6,545,109 B2 | 4/2003 | Lamanna et al. | |
| 6,555,190 B1 | 4/2003 | Tsai | |
| 2001/0023283 A1 | 11/2001 | Abusleme | |
| 2003/0008990 A1 | 1/2003 | McCarthy | |
| 2005/0048122 A1 * | 3/2005 | Grabowski | A61K 31/5377 424/486 |
| 2006/0241265 A1 * | 10/2006 | Harwood | C08C 19/44 526/335 |
| 2007/0244262 A1 * | 10/2007 | Zhang | C08F 259/08 525/242 |
| 2009/0053576 A1 | 2/2009 | Wu | |
| 2009/0065507 A1 * | 3/2009 | Ishihara | A01N 1/02 220/560.04 |

(Continued)

FOREIGN PATENT DOCUMENTS

| | | |
|---|---|---|
| EP | 0911347 A2 | 4/1999 |
| GB | 947578 A | 1/1964 |

(Continued)

OTHER PUBLICATIONS

Alfa Aesar, 3,4-Dihydro-2H-pyran, Thermo Fisher Scientific, retrieved Mar. 7, 2016, pp. 1-5, https://www.alfa.com/en/catalog/L02731/.*
ChemicalBook, Hydroxypropyl Acrylate, retrieved Mar. 7, 2016, pp. 1-2, http://www.chemicalbook.com/ChemicalProductProperty_EN_CB1499179.htm.*
Alaaeddine et al., Synthesis and characterization of original alternated fluorinated copolymers bearing glycidyl carbonate side groups, May 14, 2012, Journal of Polymer Science, pp. 3303-3312.*
ChemSpider, Dihydropyran, Royal Society of Chemistry, 2015, pp. 1-3.*

(Continued)

*Primary Examiner* — Callie E Shosho
*Assistant Examiner* — Patrick N English
(74) *Attorney, Agent, or Firm* — Lorenz & Kopf, LLP

(57) ABSTRACT

Disclosed is a copolymer film that includes a first comonomer including a chlorofluoro olefin and a second comonomer that is selected from the group consisting of itaconic acid, 2,3-dihydropyran, D-glucal, glycerine carbonate vinyl ether, 2-hydroxypropyl acrylate, maleic anhydride, vinylidene chloride, and mixtures thereof.

8 Claims, 9 Drawing Sheets

(56) References Cited

U.S. PATENT DOCUMENTS

| 2011/0210037 | A1 |   | 9/2011 | Muenster et al. |
| 2012/0184653 | A1 | * | 7/2012 | Wang ............... C08F 214/18 524/315 |
| 2013/0192755 | A1 | * | 8/2013 | Carella .............. B32B 27/08 156/330 |
| 2015/0204515 | A1 | * | 7/2015 | Xu ..................... B82Y 20/00 362/84 |

FOREIGN PATENT DOCUMENTS

| JP | S53096088 A | 8/1978 |
| JP | H05043831 A | 2/1993 |
| JP | H09309186 A | 12/1997 |
| JP | H11193312 A | 7/1999 |
| JP | 2000007733 A | 1/2000 |

OTHER PUBLICATIONS

Gumprecht, W.H., et al., "A Novel Telomerization Procedure for Controlled Introduction of Perfluro-n-Alkyl End End Groups", Journal of Flourine Chemistry, vol. 5, Issue 3, Mar. 1975 pp. 245-263.

The Supplementary Search Report dated Sep. 9, 2016 in EP Application No. 14751752.8.

EP Examination Report for Application No. 14751752.8-1308 dated Jul. 13, 2017.

Kliman, Norbert and Lazar, Milan. "Copolymerization of Trifluorochloroethylene with Vinal Chloride and Vinylidene Chloride," 1959, CAS Reference Linking Service from the American Chemical Society Journals, obtained from http://chemport.cas.org/cgi-bin/sdcgi . . . , XP55388513.

Alaaeddine, Ali, et al. "Recent Advances on New Fluorinated Copolymers Based on Carbonate and Oligo (ethylene oxide) by Radical Copolymerization," ACS Symposium Series, Jan. 2012, American Chemical Society/Oxford University Press, XP055388454, Chapter 10, p. 141-169.

Boschet, Frederic and Ameduri, Bruno. "(Co)polymers of Chlorotrifluoroethylene: Synthesis, Properties, and Application," Chemical Review 2014, ACS Publications, pubs.acs.org/CR, p. 927-980.

Japanese Office Action for Application No. 2015-558145 dated Jan. 9, 2018.

* cited by examiner

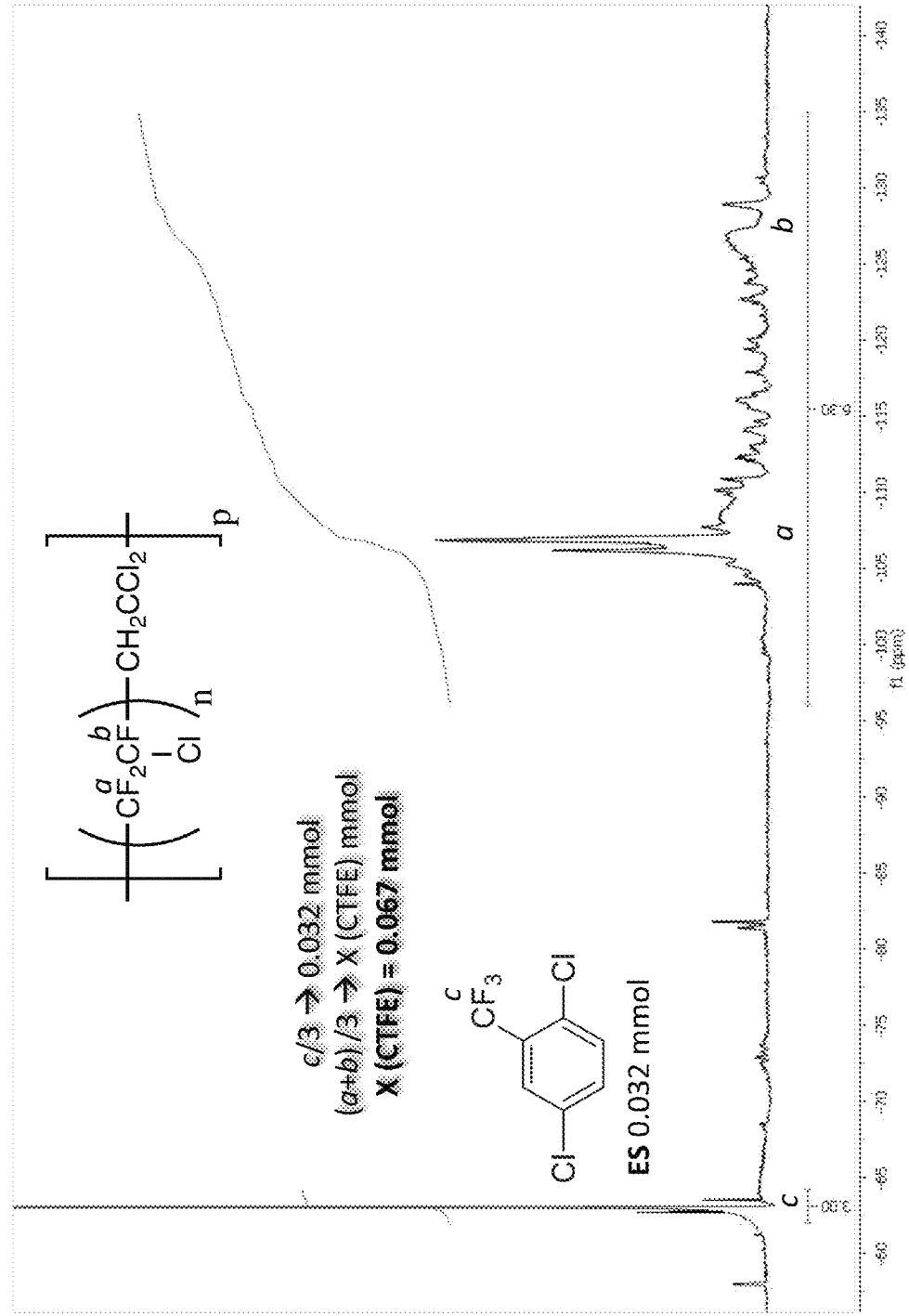
FIG. 1 $^{19}$F NMR spectrum for poly(CTFE-co-VDC) copolymer in CDCl$_3$

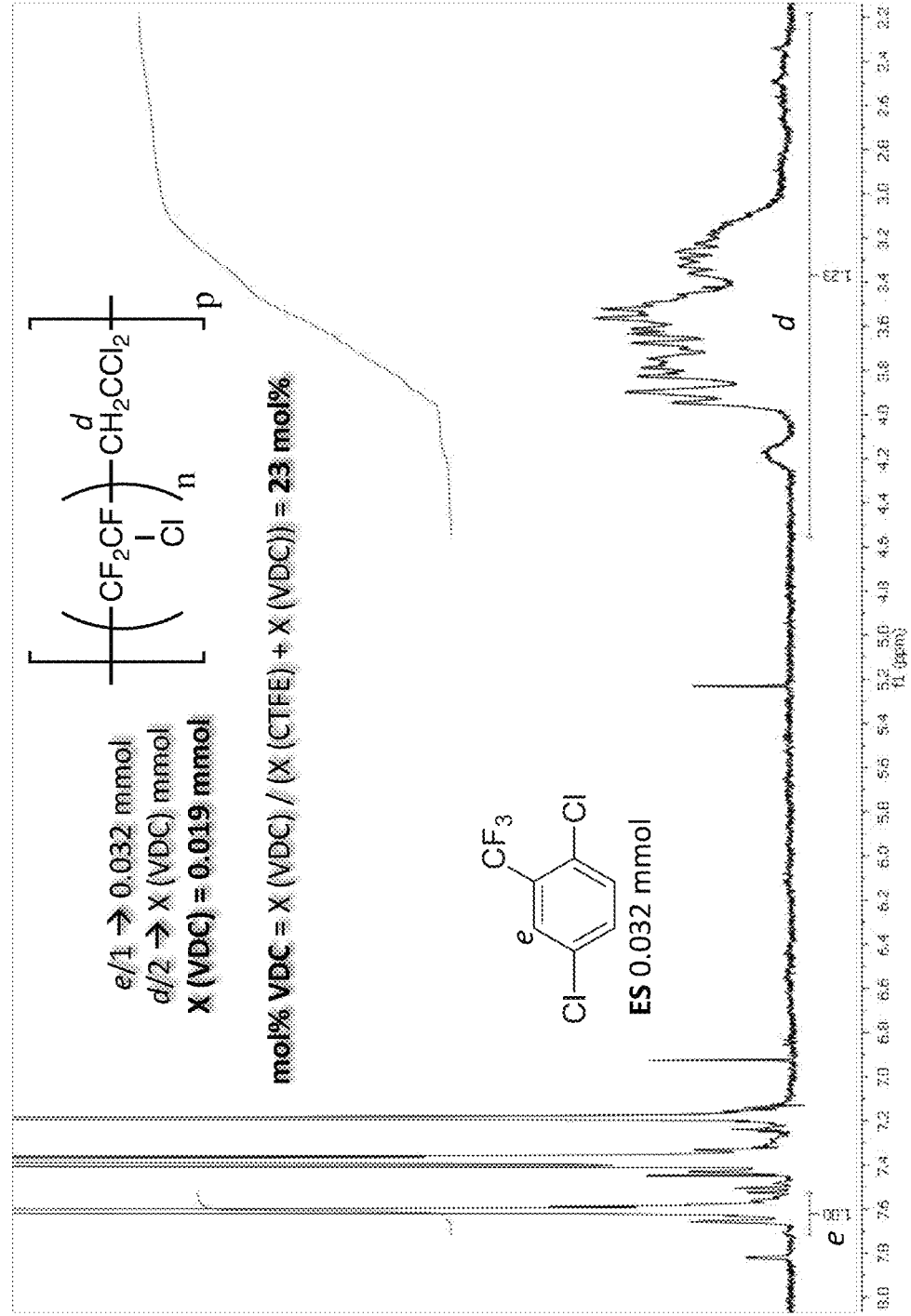
FIG. 2 ¹H NMR spectrum for poly(CTFE-co-VDC) copolymer in CDCl₃

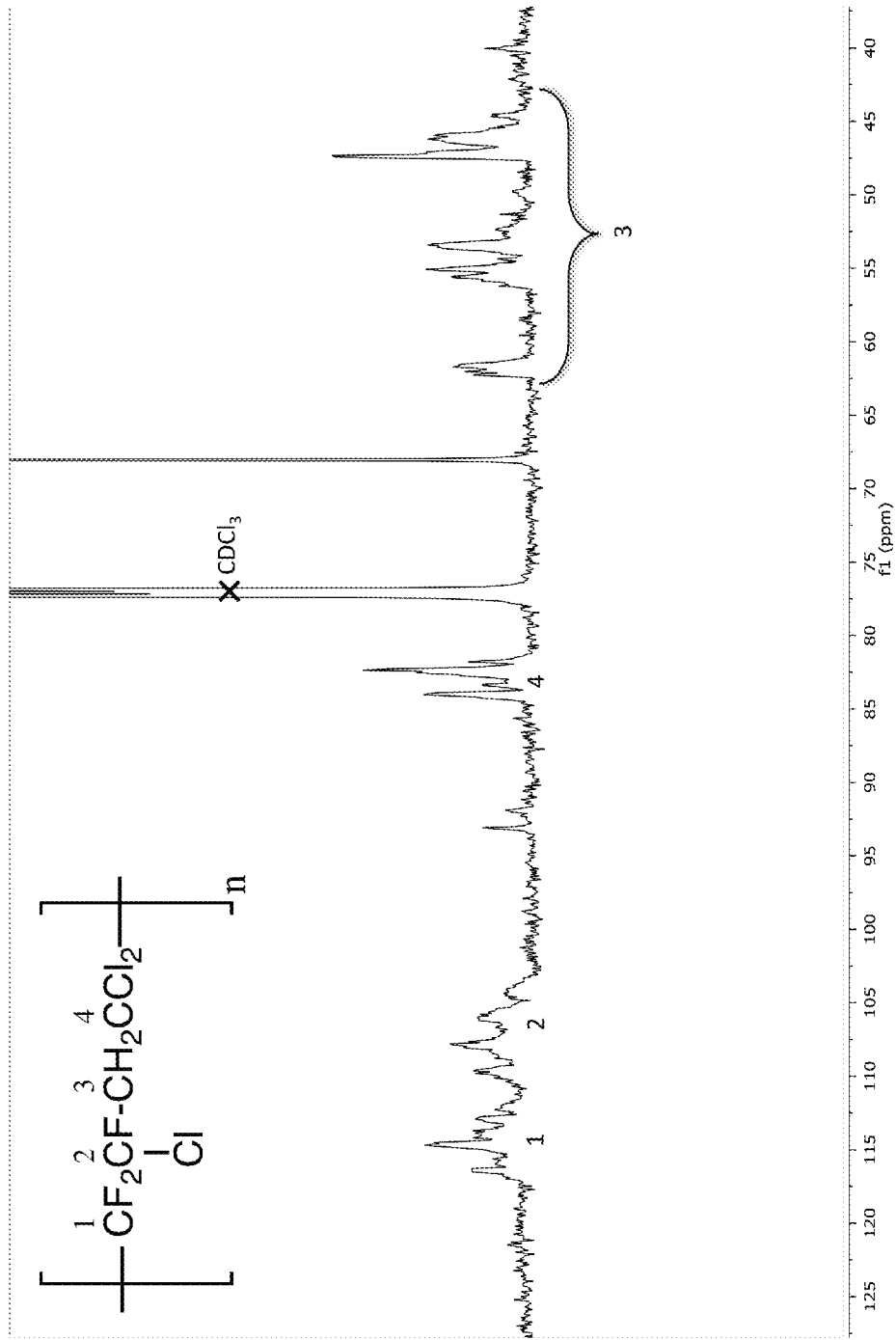
FIG. 3 $^{13}$C NMR spectrum for poly(CTFE-co-VDC) copolymer in CDCl$_3$

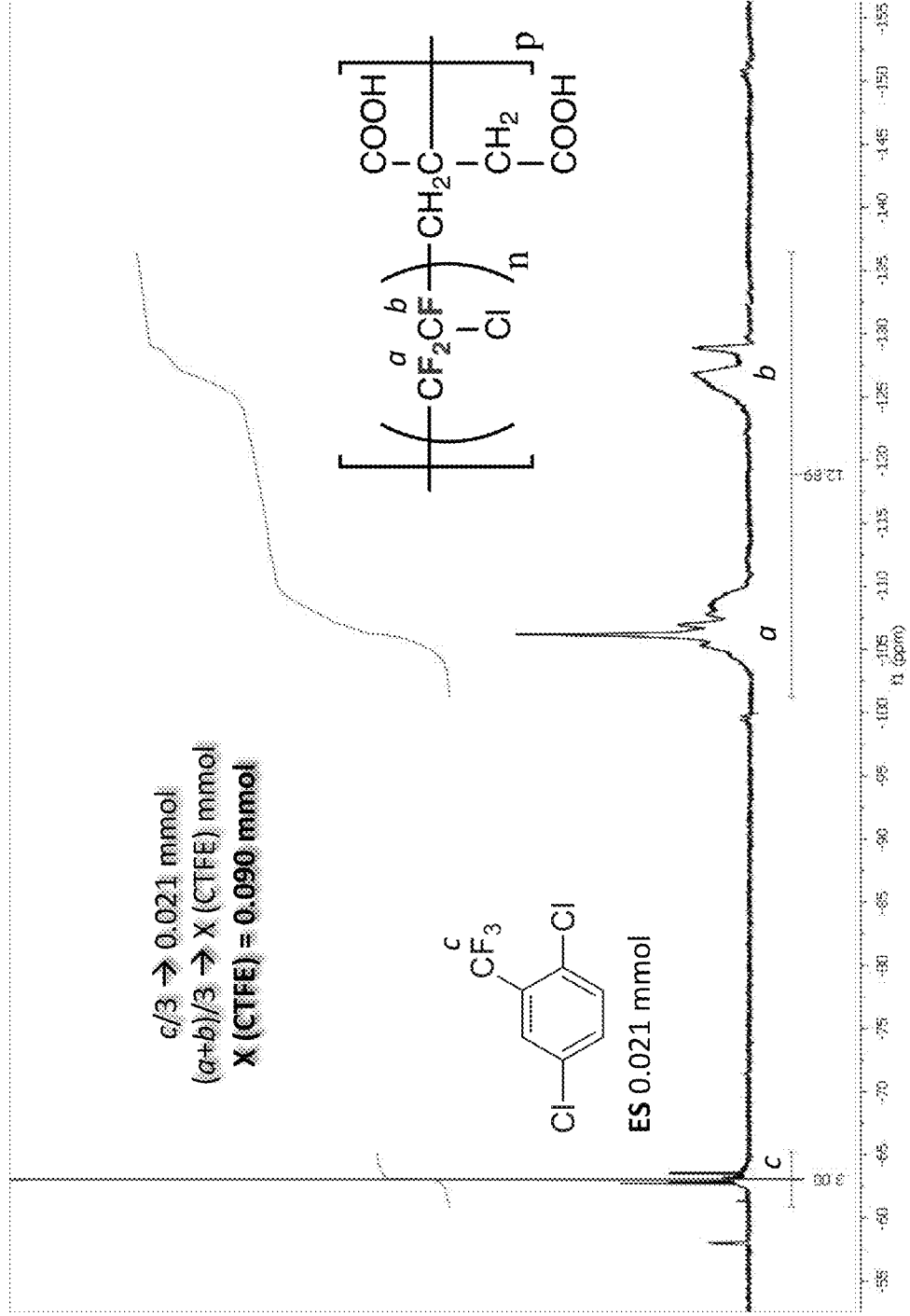
FIG. 4 ¹⁹F NMR spectrum for poly(CTFE-co-IA) copolymer in CDCl₃

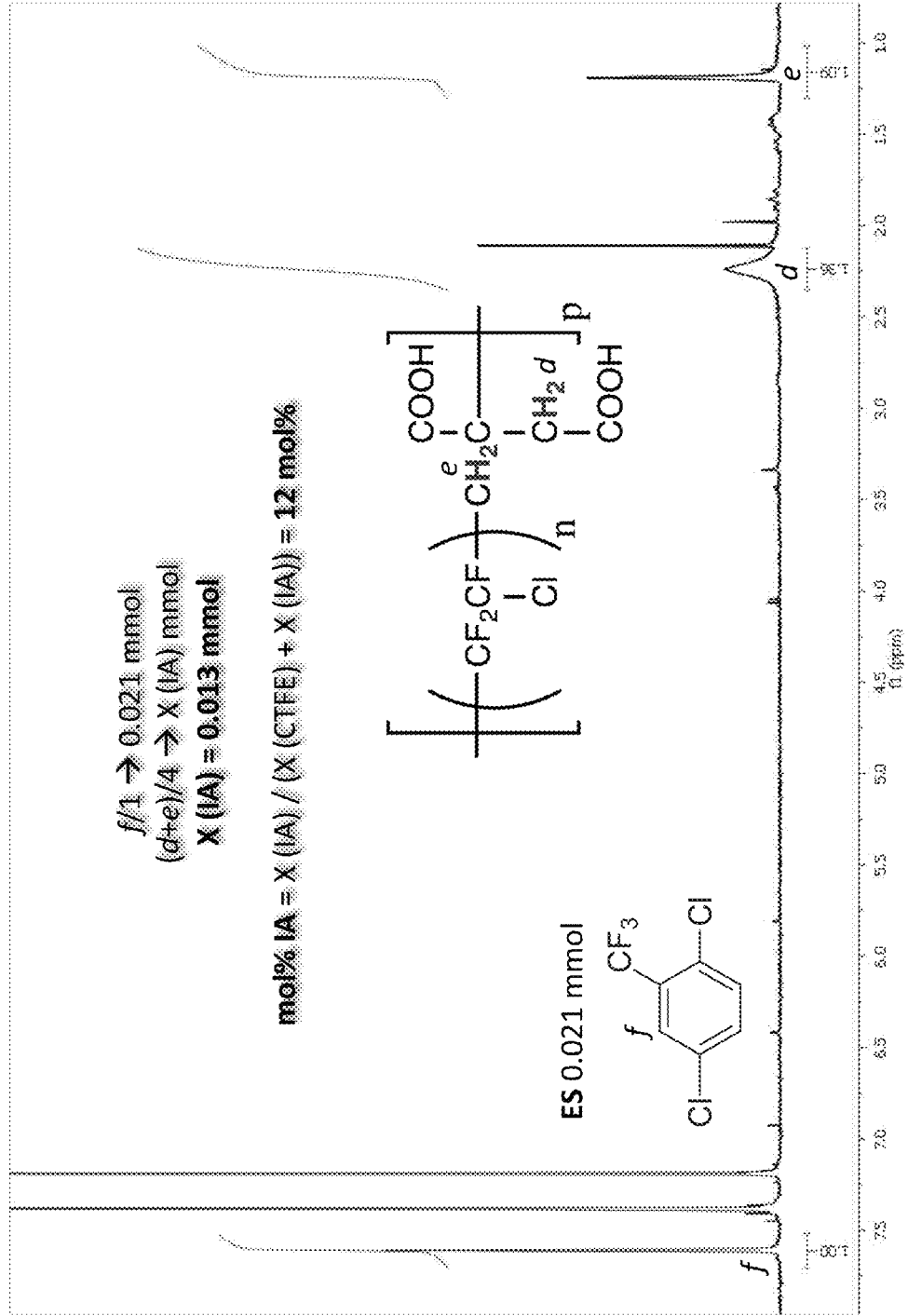
FIG. 5 ¹H NMR spectrum for poly(CTFE-co-IA) copolymer in CDCl₃

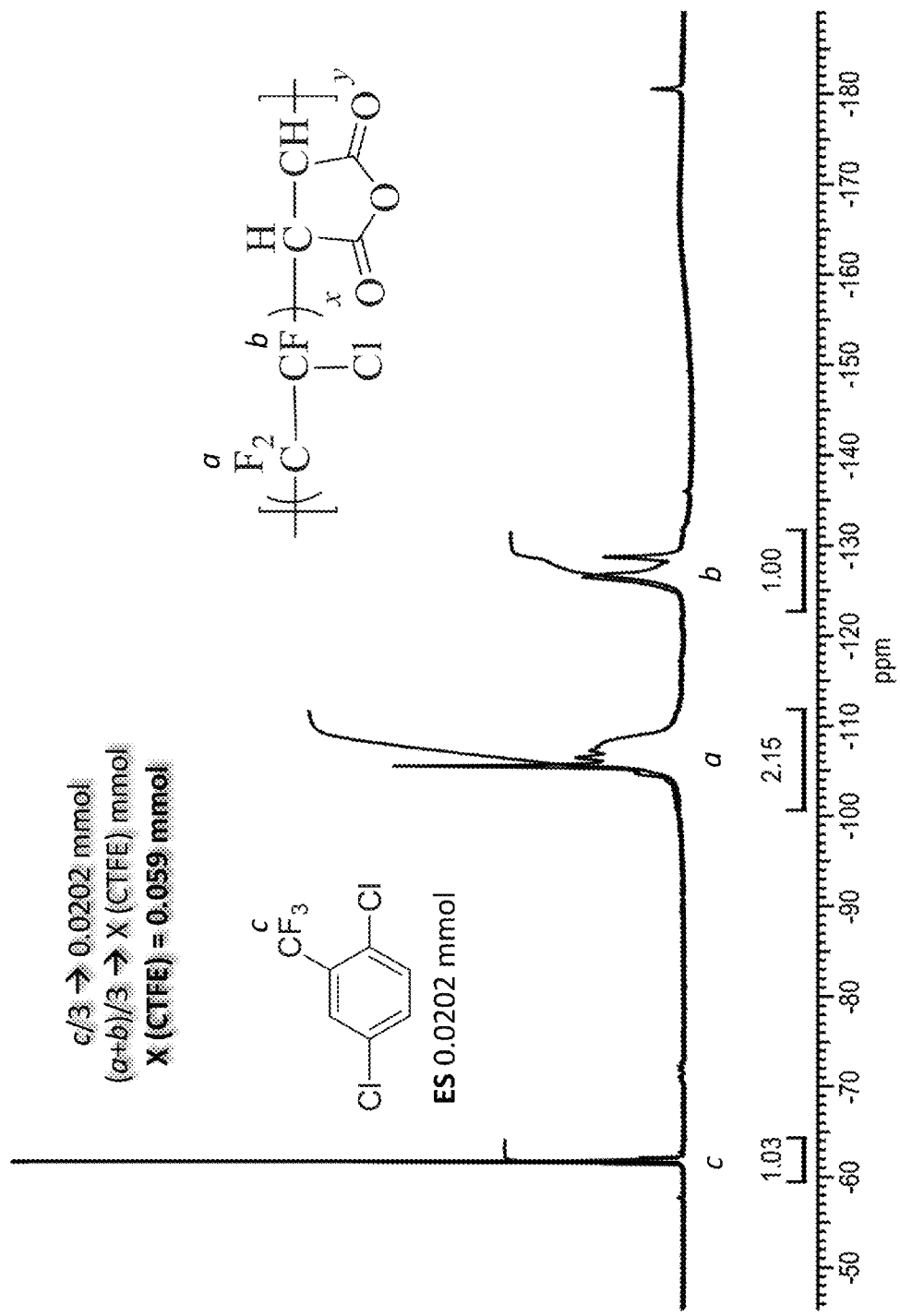
FIG. 6 $^{19}$F NMR spectrum for poly(CTFE-co-MA) copolymer in DMF-$d7$

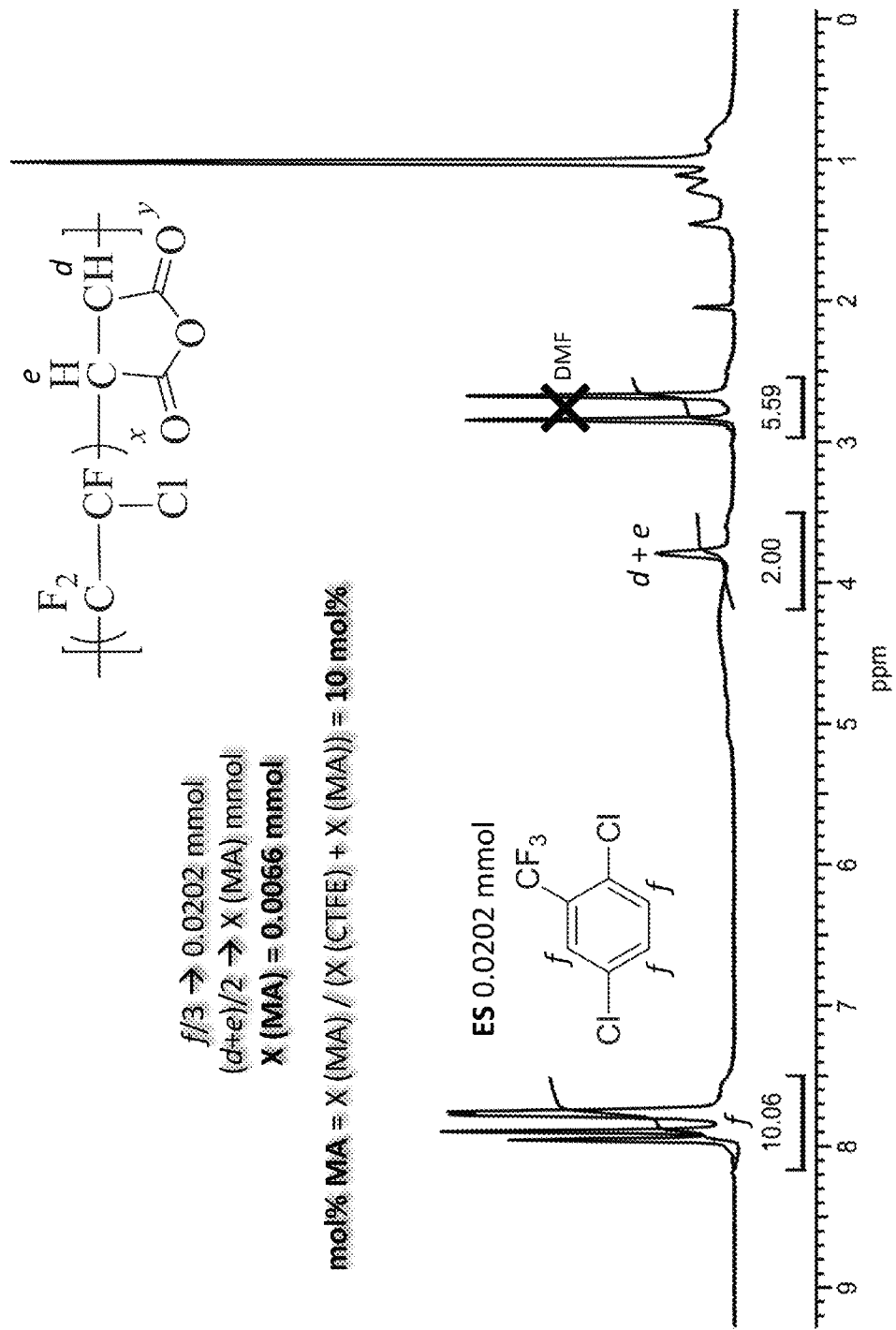
FIG. 7 ¹H NMR spectrum for poly(CTFE-co-MA) copolymer in DMF-d7

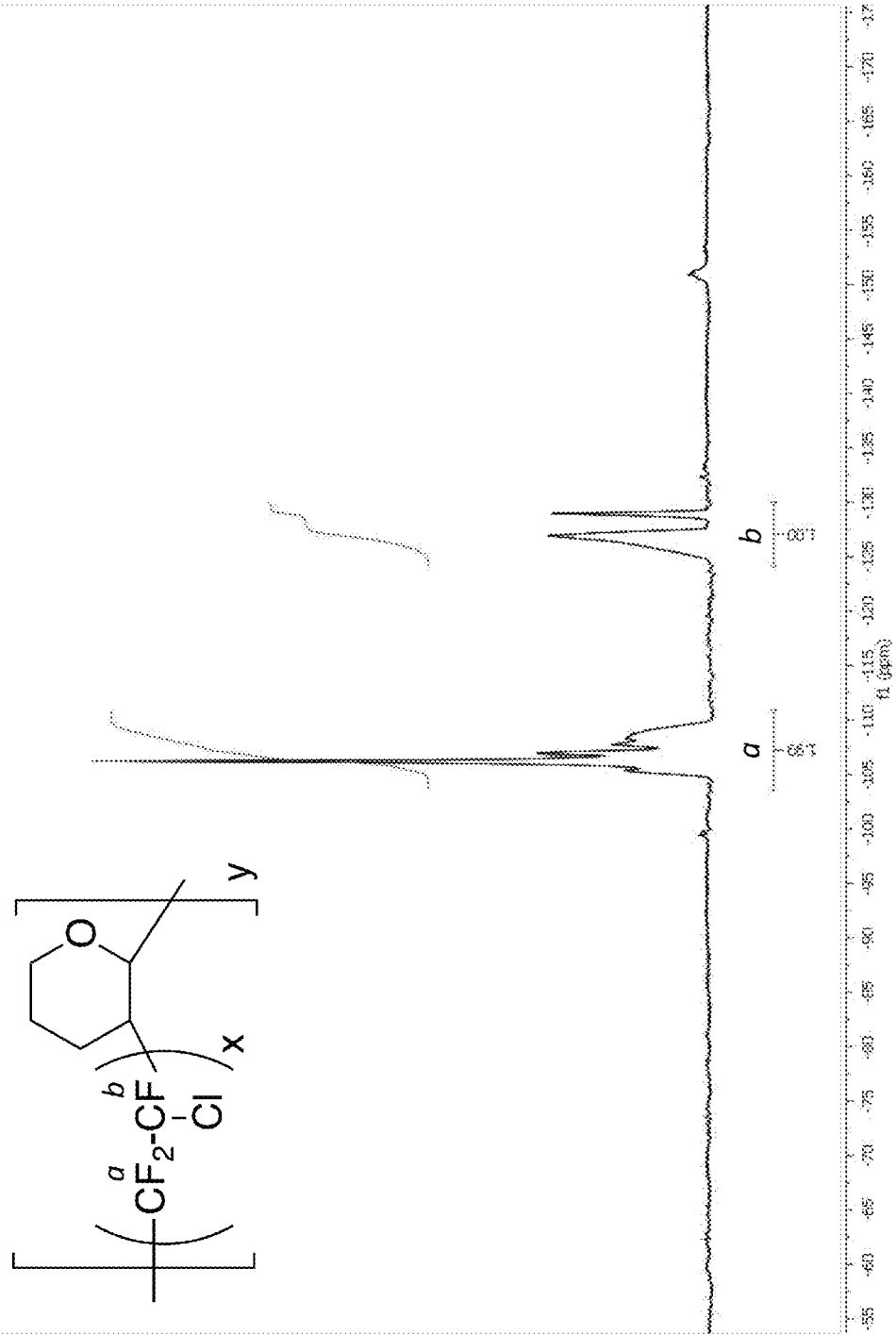
FIG. 8 $^{19}$F NMR spectrum for poly(CTFE-co-DHP) copolymer in CDCl$_3$

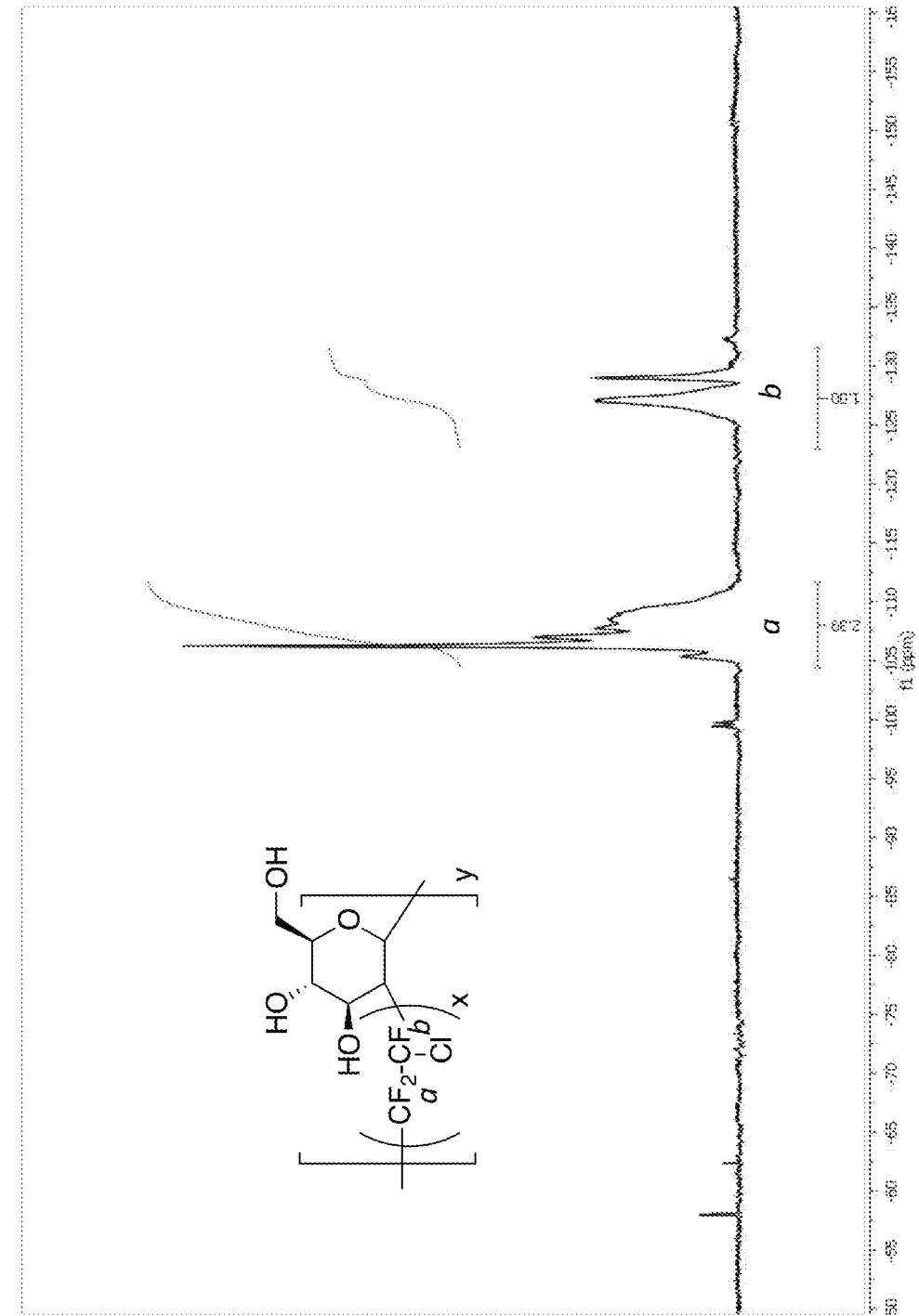
FIG. 9 ¹⁹F NMR spectrum for poly(CTFE-co-DG) copolymer in CDCl₃

FLUOROPOLYMERS CONTAINING A COPOLYMERIZED FLUOROMONOMER AND A FUNCTIONAL HYDROCARBON COMONOMER AND ARTICLES MADE FROM SUCH FLUOROPOLYMERS

CROSS-REFERENCE TO RELATED APPLICATION

This application claims the benefit of priority to U.S. Provisional Application Ser. No. 61/765,964, filed on Feb. 18, 2013, the contents of which are herein incorporated by reference in their entirety.

TECHNICAL FIELD

The present disclosure relates to fluoropolymers containing a copolymerized fluoromonomer and a functional hydrocarbon comonomer and articles made from such fluoropolymer. More particularly, the present disclosure relates to fluoropolymers containing copolymerized chlorotrifluoroethylene ("CTFE") and a functional hydrocarbon comonomer and films made from such fluoropolymers for barrier packaging applications.

BACKGROUND

Fluoropolymers exhibit unique properties that are not observed with other organic polymers. Fluoropolymers possess high thermal stability, chemical inertness, low flammability, low coefficient of friction, low surface energy, low dielectric constant, weather resistance, and gas barrier properties. These fluoropolymer properties enable their use in aerospace, automotive, construction, medical, pharmaceutical, and semiconductor industries. However, fluoropolymers have various drawbacks. As homopolymers, fluoropolymers are often highly crystalline, which induces poor solubility in common organic solvents and gives fluoropolymers relatively high melting points. Further, fluoropolymers do not adhere strongly to most surfaces and are known for their non-stick characteristics. As such, processing of fluoropolymers is difficult because of the lack of solubility in the common organic solvent that are typically used to apply polymers to various substrates, high melting points that results in application temperatures that may harm the substrate to which they are applied, and lack of adhesion to common substrates.

Some fluoropolymers derived from fluoromonomers and functional hydrocarbon monomers are known in the art and have been found to combine the properties of both the fluorine-containing polymers and the properties of the functional hydrocarbon monomers. Such materials can be used as barrier materials, chemical sensors, and ion-exchange and gas separation membranes. There are three principal ways to synthesize fluoropolymers that bear functional groups: (a) homopolymerization of functionalized fluoromonomers, (b) copolymerization of fluoroolefins with functional monomers, and (c) modification of common fluoropolymers by graft and block copolymerization with functional monomers. Chemical modification of common fluoropolymers is also possible. Because of their limited solubility and chemical inertness, however, there is a very limited range of reagents that can affect fluoropolymers, and only a very limited number of functional groups can be incorporated with fluoropolymers in this manner. Further, homopolymerization of functionalized fluoromonomers is very limited due to the difficulty in synthesis and high cost of functional fluoromonomers.

By way of example, U.S. Pat. No. 2,392,378 discloses copolymerization of CTFE with ethylene. Tabata et al. (J. Macromol. Sci. Part A 1970, 4, 801) investigated the kinetics of radical copolymerization of CTFE with ethylene, propylene, and isobutylene. U.S. Pat. No. 5,258,447 claims copolymerization of CTFE and 2-hydroxyethyl allyl ether with an unsaturated carboxylic acid ester as a third monomer. A CTFE and vinylidene chloride ("VDC") copolymer coating used to develop electrostatographic images is reported in JP 02203356 A. Copolymers of CTFE-VDC are reported as release and fluxing agents in JP 52121063 A and U.S. Pat. No. 2,944,997, respectively. A terpolymer including CTFE, vinylidene fluoride, and another fluoroolefin is disclosed in U.S. Pat. No. 3,053,818.

As noted above, fluoropolymers often find application in the pharmaceutical industry, particularly in pharmaceutical packaging application. Selecting a packaging material for a drug is critical for a successful market launch. Packaging components must meet functional requirements to help protect the purity of the product for its shelf-life, and the packaged drug can be harmed if the packaging components are not compatible with the drug. Given that many active pharmaceutical ingredients (API) and excipients in drug formulations are sensitive to their environment, there is a growing need for packaging materials with varying levels of moisture and oxygen barrier properties.

Currently, the "mid-barrier" segment, which focuses on materials with a water vapor transmission rate of about 0.3 to about 0.8 grams/mil/m$^2$-day, is serviced by polyvinylidene chloride ("PVDC")-coated polyvinyl chloride ("PVC") packaging films. Although PVDC films meet most of the critical needs in drug packaging requiring mid-barrier, they are brittle, become yellow upon exposure to light, and release gas that corrodes the tooling during processing.

Polychlorotrifluoroethylene ("PCTFE") film is also used in mid-barrier pharmaceutical and medical packaging. It is optically transparent, chemically inert, nonflammable, and plasticizer- and stabilizer-free. Its superior moisture barrier properties enable worldwide distribution of pharmaceuticals to all climates and environments including Zone 4-tropical locations. Further, PCTFE films laminate well with a wide variety of substrates and thermoform well with conventional blister packaging equipment. To date, demand for packaging materials with varying moisture barrier levels has been met primarily with PCTFE films of different thicknesses. For example, PCTFE films are available in a range from 15 microns to 150 microns. While these varying thickness materials may satisfy the barrier needs, they are not cost effective and their use is restricted to specialty packaging applications. Also, thinner films are difficult to extrude. One typical way to reduce the cost of a packaging material fabricated from a costly polymer is to form multilayer structures in which the polymer film is laminated with other, less costly polymer films. As noted above, however, fluoropolymers do not adhere strongly to most other polymers. This property is disadvantageous because poor bond strength between layers can result in the delamination of multilayer films. As a result, specialized intermediate adhesive layers that increase the cost of the packing structure are generally needed to attach most other polymer films to fluoropolymer films.

Thus, there remains a need in the art for protective barrier films that are clear and stable, exhibit good moisture barrier properties, thermoform easily using existing processing equipment, and are able to adhere to other polymers. Further, there remains a need in the art for cost effective packaging films having the moisture barrier properties that meet present and future performance demands. Still further, other desirable features and characteristics of the inventive subject matter will become apparent from the subsequent detailed description of the inventive subject matter and the appended claims, taken in conjunction with the accompanying drawings and this background of the inventive subject matter.

BRIEF SUMMARY

In one exemplary embodiment, disclosed is a copolymer film that includes a first comonomer including a chlorofluoro olefin and a second comonomer that is selected from the group consisting of itaconic acid, 2,3-dihydropyran, D-glucal, glycerine carbonate vinyl ether, 2-hydroxypropylacrylate, maleic anhydride, vinylidene chloride, and mixtures thereof.

In another exemplary embodiment, disclosed is a coated substrate packaging film that includes a substrate comprising polyvinyl chloride ("PVC") or polyethylene terephthalate ("PET") or polyethylene naphthalate ("PEN") or polyimide ("PI") and a copolymer coated on at least one surface of the substrate. The copolymer includes at least first and second comonomers. The first comonomer is a chlorofluoro olefin and the second comonomer is selected from the group consisting of: itaconic acid, 2,3-dihydropyran, D-glucal, glycerine carbonate vinyl ether, 2-hydroxypropylacrylate, maleic anhydride, vinylidene chloride, and mixtures thereof.

In yet another exemplary embodiment, disclosed is a packaged article that includes an article and a packaging film disposed about the article. The packaging film includes at least first and second comonomers. The first comonomer is a chlorofluoro olefin and the second comonomer is selected from the group consisting of: itaconic acid, 2,3-dihydropyran, D-glucal, glycerine carbonate vinyl ether, 2-hydroxypropylacrylate, maleic anhydride, vinylidene chloride, and mixtures thereof. The article may be a pharmaceutical product.

This brief summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

The present invention will hereinafter be described in conjunction with the following drawing figures, wherein like numerals denote like elements, and wherein:

FIG. 1 is a $^{19}$F NMR spectrum of a poly(CTFE-co-VDC) copolymer in accordance with the present disclosure;

FIG. 2 is a $^1$H NMR spectrum of a poly(CTFE-co-VDC) copolymer in accordance with the present disclosure;

FIG. 3 is a $^{13}$C NMR spectrum of a poly(CTFE-co-VDC) copolymer in accordance with the present disclosure;

FIG. 4 is a $^{19}$F NMR spectrum of a poly(CTFE-co-IA) copolymer in accordance with the present disclosure;

FIG. 5 is a $^1$H NMR spectrum of a poly(CTFE-co-IA) copolymer in accordance with the present disclosure;

FIG. 6 is a $^{19}$F NMR spectrum of a poly(CTFE-co-MA) copolymer in accordance with the present disclosure;

FIG. 7 is a $^1$H NMR spectrum of a poly(CTFE-co-MA) copolymer in accordance with the present disclosure;

FIG. 8 is a $^{19}$F NMR spectrum of a poly(CTFE-co-DHP) copolymer in accordance with the present disclosure; and FIG. 9 is a $^{19}$F NMR spectrum of a poly(CTFE-co-DG) copolymer in accordance with the present disclosure.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

The present disclosure provides new, cost-effective copolymeric films that are produced by copolymerizing fluoroolefins with low-cost functional hydrocarbon monomers. Embodiments of the present disclosure optimize the dilution of the fluoroolefins with the functional hydrocarbon monomers to match the performance and cost of competitive materials without impacting the other benefits of fluoropolymers. Depending on the nature and the quantity of the functional monomers, these copolymers have lower melting points and often dissolve in common organic solvents. The disclosed fluoropolymers are suitable for use in a wide variety of applications including, but not limited to, barrier films for pharmaceutical and medical packaging, linings for chemical processing equipment, gas separation membranes, wire insulation, cable jackets, hoses, tubing, seals, gaskets, and O-rings, dispersions for textile treatment, and the like.

Fluoropolymers in accordance with the present disclosure are produced via the copolymerization of a fluoromonomer and a functional hydrocarbon comonomer. In particular, the copolymerization process described herein is carried out by a free radical polymerization reaction. The free radical polymerization reaction may be conducted in bulk without any solvent or in solution, in aqueous processes such as emulsion (including a mini- or micro-emulsion), or suspension (including a mini- or micro-suspension), each with a solvent. Preferably, the process is conducted in emulsion or suspension with a solvent. In a preferred process, the reactor vessel is first charged with a free radical initiator, functional comonomer, and a solvent mixture, after which the fluoromonomer is added.

The term "fluoromonomer" as used herein means a polymerizable alkene that contains at least one fluorine atom, fluoroalkyl group, or fluoroalkoxy group attached to a carbon atom which is part of the double bond of the alkene that undergoes polymerization. The term fluoropolymer means a polymer derived by the polymerization of a fluoromonomer. Examples of fluoromonomers that can be used in the copolymerization process of the present disclosure include, for example, chlorotrifluoroethylene ("CTFE"), vinylidene fluoride ("VDF"), tetrafluoroethylene ("TFE"), trifluoroethylene, vinyl fluoride, hexafluoropropylene ("HFP"), hexafluoroisobutylene, perfluorobutylethylene ("PFBE"), pentafluoropropene, 3,3,3-trifluoro-1-propene, 2,3,3,3-tetrafluoropropene, 1,3,3,3-tetrafluoropropene, fluorinated vinyl ethers (such as perfluoromethyl vinyl ether ("PMVE") or perfluoropropyl vinyl ether ("PPVE")), fluorinated allyl ethers, fluorinated dioxoles, and combinations thereof. In a particular embodiment, the fluoromonomer is CTFE.

The term "functional hydrocarbon comonomer" as used herein means a type of molecule that contains one or more functional groups attached to a carbon atom which is part of the double bond of the alkene that undergoes polymerization. Examples of functional hydrocarbon monomers include, but are not limited to: vinylidene chloride ("VDC"), maleic anhydride ("MA"), itaconic acid ("IA"), citraconic acid, itaconic anhydride, citraconic anhydride, dihydropyran ("DHP"), vinyl acetate ("VA"), vinyl propionate, acrylonitrile, acrylic acid, methacrylic acid, vinyl sulfonic acid, vinyl phosphonic acid, D-glucal, glycerol carbonate vinyl ether ("GCVE"), 2-hydroxypropylacrylate ("HPAc") and their derivatives, and polyfluoroacrylates such as CFH=CHCO$_2$R, CFH=CFCO$_2$R, CF$_2$=CHCO$_2$R, F$_2$C=CFCO$_2$R. Particular embodiments may employ one of VDC, MA, IA, D-glucal, glycerol carbonate vinyl ether, hydroxypropyl vinyl ether, and DHP as the functional hydrocarbon monomer.

The fluoropolymers of the present disclosure include (a) polymerized units of a fluoromonomer and (b) polymerized units of a functional hydrocarbon comonomer. In some embodiments, component (a) can range from about 1 mol % to about 99.9 mol % and component (b) can range from about 0.1 mol % to about 99 mol %. In a particular embodiment, component (a) is from about 30 mol % to about 99 mol % and component (b) is from about mol % 1 to about 70 mol %. In a further particular embodiment, component (a) is from about 50 mol % to about 99 mol % and component (b) is from about 1 mol % to about 50 mol %.

The term "initiator" and the expressions "radical initiator" and "free radical initiator" refer to a chemical that is capable of providing a source of free radicals, either induced spontaneously, or by exposure to heat or light. Examples of suitable initiators include peroxides, peresters, peroxypivalates, peroxydicarbonates, and azo compounds. "Initiators" also include redox systems useful in providing a source of free radicals. The term "radical" and the expression "free radical" refer to a chemical species that contains at least one unpaired electron. The radical initiator is added to the reaction mixture in an amount sufficient to initiate and maintain the copolymerization reaction at a desired reaction rate. The order of addition may vary according to the desired process and latex emulsion characteristics.

The radical initiator may include a persulfate salt, such as sodium persulfate, potassium persulfate, or ammonium persulfate. The amount of persulfate salt added to the reaction mixture (based upon the total weight of comonomer added to the reaction mixture) may, for example, be from about 0.002 to about 1.0 weight percent. Alternatively, the radical initiator may include an organic peroxide such as an alkyl, dialkyl, or diacyl peroxide, peroxydicarbonates, and peroxy esters or mixtures thereof. Exemplary dialkyl peroxides are di-tert-butylperoxide (DTBP), dibenzoyl peroxide, or 2,5-dimethyl-2,5-di(tert-butylperoxy)hexane which may be added to the reaction mixture in an amount from about 0.01 to about 5 weight percent on total comonomer, and is added in an amount from about 0.05 to about 2.5 weight percent on total comonomer. Exemplary peroxydicarbonate initiators are di-n-propyl peroxydicarbonate, bis(tert-butyl cyclohexyl) peroxydicarbonate and diisopropyl peroxydicarbonate, which may be added to the reaction mixture in an amount from about 0.5 to about 2.5 weight percent on total comonomer. Peroxy ester initiators include tert-amyl peroxypivalate, tert-butyl peroxypivalate (TBPPi), and succinic acid peroxide. Further alternatively, the radical initiator may include an azo initiator, such as 2,2'-azobis(2-methylpropionamidine)dihydrochloride. Still further alternatively, the radical initiator may include a redox system. The term "redox system" refers to a system including an oxidizing agent, a reducing agent and optionally, a promoter as an electron transfer medium. Oxidizing agents include, for example, persulfate salts; peroxides, such as hydrogen peroxide; hydroperoxides such as tert-butyl hydroperoxide and cumene hydroperoxide; and oxidizing metal salts such as, for example, ferric sulfate. Reducing agents include, for example, sodium formaldehyde sulfoxylate, sodium and potassium sulfite, ascorbic acid, bisulfate, metabisulfite, and reduced metal salts. The promoter is a component of the redox system which, in different oxidation states, is capable of reacting with both the oxidant and the reducing agent, thereby accelerating the overall reaction. Promoters include, for example, transition metal salts such as ferrous sulfate. In redox systems, the oxidizing agent and the reducing agent may be utilized in an amount from about 0.01 to about 0.5 weight percent on total comonomer. The optional promoter may be utilized in an amount from about 0.005 to about 0.025 weight percent on total comonomer.

Preferred redox initiators are those which incorporate dialkyl peroxydicarbonates, such as diethyl, bis(tert-butyl cyclohexyl) peroxydicarbonate, di-isopropyl peroxydicarbonates, alkyl peroxypivalates such as t-butyl peroxypivalate and t-amyl peroxypivalate. More preferred are dialkyl peroxides, particularly t-butyl peroxide, dibenzoyl peroxide, dialkyl peroxydicarbonates, particularly diethyl and diisopropyl peroxydicarbonates, and t-alkyl peroxypivalates, particularly t-butyl and t-amyl peroxypivalates. The most preferred reagents are the free radical initiators 2,5-dimethyl-2,5-di(tert-butylperoxy)hexane (TRIGONOX®101), and tert-butyl peroxypivalate.

Solvents useful in the free-radical initiated copolymerization reaction include any solvent capable of dissolving the reactants and the initiator. Suitable solvents non-exclusively include conventional organic solvents such as esters of formula R—COOR' where R and R' are independently $C_{1-5}$ alkyl groups, or ester OR" where R" is an alkyl containing 1 to 5 carbon atoms, and where R may also be hydrogen. Of these organic solvents, it is preferred that R=H or CH$_3$ and R'=CH$_3$, C$_2$H$_5$, i-C$_3$H$_7$ or t-C$_4$H$_9$, and non-cyclic carbonates. Also useful are fluorinated solvents which non-exclusively include ClCF$_2$CFCl$_2$ (TCTFE, known as CFC-113), C$_6$F$_{14}$, n-C$_4$F$_{10}$, and 1,1,1,3,3-pentafluorobutane. Particularly preferred fluorinated solvents include perfluoro-2-n-butyl-tetrahydrofuran, alone or in combination with 1,1,2-trichloro-trifluoroethane (TCTFE) as a co-solvent. Other useful solvents non-exclusively include conventional solvents such as 1,2-dichloroethane, isopropanol, tertiary butanol, acetonitrile and butyronitrile. The preferred solvents are methyl acetate, acetonitrile, perfluoro-n-hexane, perfluoro-2-n-butyl-tetrahydrofuran, 1,1,1,3,3-pentafluorobutane, and a mixture of 1,1-dichloro-2,2,3,3-pentafluoropropane and 1,3-dichloro-1,1,2,2,3-pentafluoropropane. The quantity of solvent used in the reaction would be determinable by one skilled in the art. Preferably, the solvent is used in an amount of from about 30% to about 60% by weight based on the combined weight of the reactants, the reagent, and the solvent.

To increase the solubility of the fluorinated monomers and functional hydrocarbon comonomers, a co-solvent may also be used in combination with the solvent. Useful co-solvents non-exclusively include acetonitrile, butyronitrile, acetone, alkyl ketones such as methyl ethyl ketone, cyclohexanone, and water. For example, in an emulsion or suspension copolymerization process, water is generally used as the reaction medium, typically deionized, nitrogen-purged water. In this regard, a solvent as identified above may be present in water as a co-solvent. When a co-solvent is present, the solvent preferably comprises from about 30% to about 70% by weight of the combined solvent and co-solvent. However, it should be noted that fluorinated monomers are only partially soluble in water, so when water is present as a co-solvent, a surfactant is typically needed, e.g. as an emulsifier. In this regard, useful surfactants include anionic, cationic and non-ionic surfactants. When present, the surfactant preferably comprises from greater than about 0% to about 10% by weight of the solvent system, i.e. the weight of the solvent alone or of a combination of a solvent and a co-solvent, more preferably from greater than about 0% to about 5% by weight, and most preferably from about 1% to about 3% by weight of the solvent system. Preferred surfactants are anionic surfactants, particularly perfluorinated anionic surfactants. Examples of suitable perfluorinated anionic surfactants include ammonium perfluoro octanoate, perfluorinated alkyl/aryl ammonium (metal) carboxylates and perfluorinated alkyl/aryl lithium (metal) sulfonates wherein the alkyl group has from about 1 to about 20 carbon atoms, and amphiphilic copolymers based on poly (ethylene oxide). Suitable surfactants also include fluorinated ionic or nonionic surfactants, hydrocarbon-based surfactants such as the alkylbenzenesulfonates or mixtures of any of the foregoing.

Surfactants can also be used in combination with the comonomers to provide further stability to the polymer emulsion. Exemplary surfactants are non-fluorinated hydrocarbon surfactants, siloxane surfactants or a combination thereof. For example the monomer(s) can be used in combination with sodium dodecyl sulfate, sodium dodecyl benzene sulfonate (SDDBS), sodium octyl sulfonate, sodium lauryl sulfate, ammonium lauryl sulfate, and sodium laureth sulfate, among others.

Chain-transfer agents may optionally be added to the polymerization process to regulate the molecular weight of the product. They may be added to a polymerization reaction in a single portion at the beginning of the reaction, or incrementally or continuously throughout the reaction. The amount and mode of the addition of a chain-transfer agent depends on the activity of the particular chain-transfer agent employed, and on the desired molecular weight of the polymer product. The amount of chain-transfer agent added to the polymerization reaction is from about 0.05 to about 5 weight percent, for example from about 0.1 to about 2 weight percent based on the total weight of comonomer added to the reaction mixture. Oxygenated compounds such as alcohols, carbonates, ketones, esters, and ethers may serve as chain-transfer agents. An example of an oxygenated compound useful as a chain-transfer agent includes isopropyl alcohol. Other classes of compounds that may serve as chain-transfer agents include, for example, halocarbons and hydrohalocarbons, such as chlorocarbons. Alkanes such as ethane and propane may also function as chain-transfer agents.

The polymerization reaction mixture may optionally contain a buffering agent to maintain a controlled pH throughout the polymerization reaction. The pH is controlled within the range of from about 4 to about 8, to minimize undesirable color development in the product. Buffering agents may include organic or inorganic acids or alkali metal salts thereof, or bases or salts of such organic or inorganic acids, that has at least one pKa value in the range of from about 4 to about 10, for example from about 4.5 to about 9.5. Buffering agents include, for example, phosphate buffers and acetate buffers. A "phosphate buffer" is a salt or a mixture of salts of phosphoric acid. An "acetate buffer" is a salt of acetic acid.

The addition of a paraffin wax or hydrocarbon oil to the reaction serves as an antifoulant to minimize or prevent polymer adhesions to the reactor components. Any long chain saturated hydrocarbon wax or oil can perform this function. The amount of oil or wax added to the reactor is an amount that serves to minimize the formation of polymer adhesions on the reactor components. The amount is generally proportional to the interior surface area of the reactor and may vary from about 0.5 to about 50 mg per square centimeter of reactor interior surface area.

The temperature used for copolymerization may vary depending on the initiator system chosen. The copolymerization temperature, in an embodiment, is from about 30° C. to about 130° C., for example from about 60° C. to about 100° C. The pressure used for copolymerization may vary from about 200 kPa to about 20,000 kPa, depending on the capabilities of the reaction equipment, the initiator system chosen, and the comonomer selection. For example, the polymerization pressure is from about 2,000 kPa to about 10,000 kPa.

The polymerization occurs under stirring or other agitation. The stirring/agitation may be constant, or may be varied to optimize process conditions during the course of the polymerization. In one embodiment, both multiple stirring speeds and multiple temperatures are used for controlling the reaction. The reaction vessel used to prepare the composition described herein is one that is capable of being pressurized and agitated. Conventional commercial autoclaves which may be sealed and pressurized to the required reaction pressures (for example in excess of 3.36 MPa (500 psig)) are suitable. Horizontally inclined autoclaves and vertically inclined autoclaves may both be used.

According to one embodiment of the present disclosure, a pressurized polymerization reactor equipped with a stirrer and heat controller is charged with water and/or other solvent, for example deionized water, one or more functional hydrocarbon monomer and at least one fluoromonomer. The mixture may optionally contain one or more of a surfactant, a buffering agent, an antifoulant or a chain-transfer agent for molecular weight regulation of the copolymer product.

Prior to introduction of the functional hydrocarbon monomer, air is removed from the reactor in order to obtain an oxygen-free environment for the copolymerization reaction. The order in which the polymerization components are assembled may be varied, although it is generally provided that at least a portion of the comonomer is present in the aqueous reaction medium prior to the initiation of the copolymerization of the fluoromonomer (for example, CTFE). An additional amount of comonomer may be fed to the reactor during the reaction. In one embodiment, water, initiator, comonomer, and optionally surfactant, antifoulant, chain transfer agent, and/or buffer are charged to the reactor, and the reactor heated to the desired reaction temperature. The fluoromonomer is then fed into the reactor at a rate which provides an essentially constant pressure. Alternatively the fluoromonomer, comonomer, and initiator may be fed to the reactor, along with one or more of the optional ingredients. Other variations for copolymerization processes are contemplated, as known in the art. The comonomer feed is terminated when the desired weight of comonomer has been fed to the reactor. Additional radical initiator is optionally added, and the reaction is allowed to react out for a suitable amount of time. The reactor pressure drops as the comonomer within the reactor is consumed.

The polymerization is conducted under agitation to ensure proper mixing. An adjustment of the agitation rate during the polymerization may be desirable to prevent premature coagulation of the particles. Although the agitation rate and reaction time typically depends upon the amount of chlorofluoropolymer product desired, one of ordinary skill in the art can readily optimize the conditions of the reaction without undue experimentation to get the claimed results. The agitation rate is in the range of from about 5 to about 800 rpm and, for example from about 25 to about 700 rpm, depending on the geometry of the agitator and the size of the vessel. The reaction time ranges from about 1 to about 30 hours, for example from about 10 to about 20 hours.

Upon completion of the polymerization reaction, the reactor is brought to ambient temperature and the residual unreacted comonomer is vented to atmospheric pressure. The aqueous reaction medium containing the fluoropolymer is then recovered from the reactor. The recovered material includes a stable mixture of the reaction components, i.e., water, comonomer, initiator (and/or decomposition products of the initiator) and fluoropolymer solids. The product mixture containing the fluoropolymer is filtered, washed with deionized water and dried to constant weight to give solid fluoropolymers. Alternatively, the product mixture containing the fluoropolymer is filtered off to remove the solvents and the resulting crude product is solubilized in an organic solvent and then precipitated out using a different solvent. The precipitated product is dried to constant weight to give solid fluoropolymers. The resulting copolymer includes a random ordering of the chlorofluoro olefin comonomer and the functional comonomer.

In a particular embodiment, the fluoromonomer employed in the above-described copolymerization reaction is CTFE. In various embodiments, the functional hydrocarbon monomer employed in the above-described copolymerization reaction is alternatively itaconic acid, 2,3-dihydropyran, D-glucal, glycerol carbonate vinyl ether, 2-hydroxypropylacrylate, maleic anhydride, or vinylidene chloride. Mixtures of such functional comonomers are also contemplated for copolymerization with a chlorofluoro olefin such as CTFE. In particular embodiments, the copolymer includes copolymers of CTFE and itaconic acid ("poly(CTFE-co-IA) copolymers"), copolymers of CTFE and 2,3-dihydropyran ("poly(CTFE-co-DHP) copolymers"), copolymers of CTFE and D-glucal ("poly(CTFE-co-DG) copolymers"), copolymers of CTFE and glycerol carbonate vinyl ether ("poly(CTFE-co-GCVE"), copolymers of CTFE, copolymers of CTFE and maleic anhydride ("poly(CTFE-co-MA) copolymers"), copolymers of CTFE and 2-hydroxypropylacrylate ("poly(CTFE-co-HPAc) copolymers"), and copolymers of CTFE and vinylidene chloride ("poly(CTFE-co-VDC) copolymers").

All of the materials used to make the fluoropolymers of the present disclosure are commercially available. For example, CTFE is available from Honeywell International Inc. of Morristown, N.J. The functional comonomers IA, DHP, DG, MA, GCVE, HPAc, and VDC can all be commercially obtained from Sigma-Aldrich Co. L.L.C. of St. Louis, Mo.

As noted above, the fluoropolymers described herein are suitable for use in a wide variety of applications. Using the particular example of pharmaceutical packaging, the described fluoropolymers can be prepared either as an extruded film (via melt extrusion) or dispersed, suspended or dissolved in a solvent and the resulting dispersion, suspension or solution can be coated on substrates by roll or spray coating, casting, dipping, or doctor blade application. The solvent is then evaporated to form a uniform layer of deposited fluoropolymer, followed by heating and melting at a temperature higher than the melting point and lower than the decomposition point of the fluoropolymer to form a uniformly coated film. Suitable substrates include polyvinyl chloride ("PVC"), polyethylene terephthalate ("PET"), polyethylene naphthalate ("PEN"), polypropylene teraphthalate ("PPT"), polypropylene naphthalate ("PPN"), polyimide ("PI") or any suitable synthetic polymer known in the art.

In the example of melt extrusion, the raw copolymer material thermoplastic material, often provided in the form of nurdles (small beads, often called resin in the industry), is gravity fed from a top mounted hopper into the barrel of the extruder. The material enters through the feed throat (an opening near the rear of the barrel) and comes into contact with the screw. The rotating screw (normally turning at up to 120 rpm) forces the plastic beads forward into the barrel which is heated to the desired melt temperature of the molten polymer. In most processes, a heating profile is set for the barrel in which three or more independent PID controlled heater zones gradually increase the temperature of the barrel from the rear (where the plastic enters) to the front. This allows the beads to melt gradually as they are pushed through the barrel and lowers the risk of overheating which may cause degradation in the polymer. At the front of the barrel, the molten plastic leaves the screw and travels through a screen pack to remove any contaminants in the melt. After passing through the screen the molten polymer enters the die. The die is what gives the final product its profile and must be designed so that the molten plastic evenly flows from a cylindrical profile to the product's profile shape. Almost any shape imaginable can be created so long as it is a continuous profile. The product is thereafter cooled, which can be achieved by pulling the extrudate through a water bath. A secondary extrusion process may occur simultaneously and adjacent to the described extrusion process, with both extrusions being joined together after passing through their respective dies to form a co-extruded product. Once the product has cooled, it can be spooled, or cut into lengths for later use. The melt extrusion can be provided at a thickness, for example from about 15 microns to about 150 microns.

In the example of coated substrates, the fluoropolymer compositions in accordance with the present disclosure may be applied as a liquid directly to suitable polymeric substrates by conventional coating means with no need to form a preformed film. Techniques for producing such coatings include conventional methods of casting, dipping, spraying and painting. When the fluoropolymer coating contains fluoropolymer in dispersion form, it is typically applied by casting the dispersion onto the substrate, using conventional means, such as spray, roll, knife, curtain, gravure coaters, or any other method that permits the application of a uniform coating without streaks or other defects. Spray and roller applications are the most convenient application methods. The dry coating thickness of cast dispersion is preferably about 12 microns and about 250 microns, preferably between about 30 microns to about 130 microns. After application, the wet solutions or dispersion are dried to remove the solvent and coalesced thermally if necessary to form the fluoropolymer coating on the substrate. With some compositions in which the fluoropolymer is in solution form, the formulations can be coated onto substrates and allowed to air dry at ambient temperatures. Although not necessary to produce a coalesced film, heating is generally desirable to dry the coating more quickly. Drying temperatures are preferably in the range of about 25° C. (ambient conditions) to about 200° C. (oven temperature—the film temperature will be lower). The temperature used should also be sufficient to promote the interaction of the functional groups in the adhesive polymer with the functional groups of the polymeric substrate to provide secure bonding of the fluoropolymer coating to the substrate. This temperature varies widely with the adhesive polymer employed and the functional groups of substrate and can range from room temperature to oven temperatures in excess of that required for the coalescence of fluoropolymers in dispersion form as discussed below. When the fluoropolymer in the composition is in dispersion form, the solvent may be removed and the fluoropolymer heated to a sufficiently high temperature such that the fluoropolymer particles coalesce into a continuous film. Preferably, the fluoropolymer in the coating is heated to a temperature of about 150° C. to about 250° C. The solvent used preferably aids in coalescence, i.e., enables a lower temperature to be used for coalesce than would be necessary with no solvent present. Thus, the conditions used to coalesce polymer will vary with the fluoropolymer used, the thickness of the cast dispersion and the substrate film, and other operating conditions. In a particular embodiment, the fluoropolymer coating composition is applied to a substrate film. Preferably, the substrate film includes a primer layer providing functional groups that interact with said compatible adhesive polymer to promote bonding. Preferably, the substrate film is polyester such a polyethylene terephthalate, polyvinyl chloride or a coextrudate of polyethylene terephthalate/polyvinyl chloride. In another embodiment, the fluoropolymer coating is applied to both surfaces of the substrate film. This can be performed simultaneously on both sides of the polymeric substrate or alternately, the coated substrate can be dried, turned to the uncoated side and resubmitted to the same coating head to apply coating to the opposite side of the film to achieve coating on both sides of the film.

ILLUSTRATIVE EXAMPLES

The present disclosure is now illustrated by the following non-limiting example. It should be noted that various changes and modifications can be applied to the following example and processes without departing from the scope of this invention, which is defined in the appended claims. Therefore, it should be noted that the following example should be interpreted as illustrative only and not limiting in any sense.

Poly(CTFE-co-VDC) Copolymer—Example 1

A poly(CTFE-co-VDC) copolymer was prepared in accordance with the present disclosure. The copolymer was prepared in a 600 mL Hastelloy Parr Autoclave equipped with a manometer, a rupture disk, and inner and outlet valves. The autoclave was purged with 20 bars of nitrogen pressure to prevent any leakage. A 20 mm Hg vacuum was then operated for 15 minutes. The reactants including the initiator TBPPi (2.13 g, 9.20 mmol, 2 mol %), the comonomer VDC (3.10 g, 32 mmol, 6 mol % in the feed), and the solvent mixture ($C_4H_5F_5$: 200 mL, deionized water: 200 mL) were transferred into the autoclave through a funnel. After cooling in a liquid nitrogen/acetone mixture, the monomer CTFE (66 g, 567 mmol, 94 mol %) was introduced by double weighing (i.e., the difference of weight before and after feeding the autoclave with CTFE). The reactor was heated up gradually to 74° C. ($P_{max}$=8 bar). The reaction was stopped after 10-20 hours (ΔP=2 bar) and the autoclave was cooled down to room temperature. After purging the non-reacted CTFE, the conversion of CTFE was determined to be 90%. The reaction mixture was filtered off to remove the solvents and the resulting crude product was solubilized in chloroform and then precipitated from cold methanol. The polymer was dried under high vacuum at 60° C. until constant weight to produce 23.0 grams of poly(CTFE-co-VDC) copolymer (33% yield) as a white powder.

The product was analyzed by $^{19}$F (FIG. 1), $^1$H (FIG. 2), and $^{13}$C (FIG. 3), NMR spectroscopy. The molar percentage of VDC in the copolymer was determined to be 23 mol % by use of 2,5-dichlorotrifluorobenzene as an external standard. Water vapor permeation analysis for a melt-pressed plaque at 37.8° C. and 100% relative humidity revealed a water intrusion rate of 0.38 grams/mil/m$^2$-day. Further, differential scanning calorimetric (DSC) analysis of the copolymer revealed a glass transition temperature ($T_g$) value of 12° C. and a melt temperature ($T_m$) value of 180° C.

Poly(CTFE-co-VDC) Copolymer—Example 2

A poly(CTFE-co-VDC) copolymer was prepared in accordance with the present disclosure. The copolymer was prepared in a 600 mL Hastelloy Parr autoclave equipped with a manometer, a rupture disk, and inner and outlet valves. The autoclave was purged with 20 bars of nitrogen pressure to prevent any leakage. A 20 mm Hg vacuum was then operated for 15 minutes. The reactants including the initiator TBPPi (2.13 g, 9.2 mmol, 2 mol %), the comonomer VDC (5.80 g, 60 mmol, 10 mol % in the feed), and the solvent mixture ($C_4H_5F_5$: 200 mL, deionized water: 200 mL) were added into the autoclave through a funnel. After cooling in a liquid nitrogen/acetone mixture, the monomer CTFE (62.9 g, 540 mmol, 90 mol %) was introduced by double weighing (i.e., the difference of weight before and after feeding the autoclave with CTFE). The reactor was heated up gradually to 74° C. (Pmax=5 bar). The reaction was stopped after 20 hours, and the autoclave was cooled down to room temperature. After purging the non-reacted CTFE, the conversion of CTFE was determined to be 50%. The reaction mixture was filtered off to remove the solvents, and the resulting crude product was solubilized in chloroform and then precipitated from cold methanol. The polymer was dried under high vacuum at 60° C. until constant weight to produce 18.5 grams poly(CTFE-co-VDC) copolymer (27% yield) as a white powder.

The product was analyzed by $^1$H, $^{13}$C, and $^{19}$F NMR spectroscopy. The molar percentage of VDC in the copolymer was determined to be 38 mol %.

Poly(CTFE-co-VDC) Copolymer—Example 3

A poly(CTFE-co-VDC) copolymer was prepared in accordance with the present disclosure. The copolymer was prepared in a 600 mL Hastelloy Parr autoclave equipped with a manometer, a rupture disk, and inner and outlet valves. The autoclave was purged with 20 bars of nitrogen pressure to prevent any leakage. A 20 mm Hg vacuum was then operated for 15 minutes. The reactants including the initiator TBPPi (2.13 g, 9.2 mmol, 2 mol %), the comonomer VDC (1.20 g, 12 mmol, 2 mol % in the feed), and the solvent mixture ($C_4H_5F_5$: 100 mL, deionized water: 300 mL) were transferred into the autoclave through a funnel. After cooling in a liquid nitrogen/acetone mixture, the monomer CTFE (68.5 g, 588 mmol, 98 mol %) was introduced by double weighing (i.e., the difference of weight before and after feeding the autoclave with CTFE). The reactor was heated up gradually to 74° C. (Pmax=8 bar). The reaction was stopped after 20 hours and the autoclave was cooled down to room temperature. After purging the non-reacted CTFE, the conversion of CTFE was determined to be 78%. The reaction mixture was filtered off to remove the solvents, and the resulting crude product was solubilized in chloroform and then precipitated from cold methanol. The polymer was dried under high vacuum at 60° C. until constant weight to produce 39.0 grams poly(CTFE-co-VDC) copolymer (56% yield) as a white powder.

The product was analyzed by $^1$H, $^{13}$C, and $^{19}$F NMR spectroscopy. The molar percentage of VDC in the copolymer was determined to be 16 mole %. Water vapor permeation analysis for a melt-pressed plaque at 37.8° C. and 100% relative humidity revealed a water intrusion rate of 0.26 grams/mil/m$^2$-day.

Poly(CTFE-co-VDC) Copolymer—Example 4

A poly(CTFE-co-VDC) copolymer was prepared in accordance with the present disclosure. The copolymer was prepared in a 600 mL Hastelloy Parr autoclave equipped with a manometer, a rupture disk, and inner and outlet valves was purged with 30 bars of nitrogen pressure to prevent any leakage. A 20 mm Hg vacuum was then operated for 15 minutes. The following reactants were transferred into the autoclave through a funnel: VDC (1.26 g, 13.3 mmol, 3 mol %), (NH$_4$)$_2$S$_2$O$_8$ (2.1 grams in 10 mL of deionized water), Na$_2$S$_2$O$_5$ (1.7 grams in 10 mL of deionized water), FeSO$_4$.7HO (1.5 grams in 10 mL of deionized water), H$_2$SO$_4$ (1.5 grams in 10 mL of deionized water), and deionized water (460 mL). After cooling the autoclave in liquid nitrogen, CTFE (49 g, 420 mmol, 97 mol %) was introduced by double weighing (i.e., the difference of weight before and after feeding the autoclave with CTFE). The reactor was heated up to 40° C. (P$_{max}$=10 bar). The reaction was stopped after 20 hours (ΔP=0 bar) and then the autoclave was cooled down to room temperature. After purging the non-reacted CTFE (5 g), the product mixture was filtered-off, and the resulting solid was dried under high vacuum at 80° C. for 24 hours until constant weight to produce 37.7 grams of a white powder (75% yield).

NMR spectrum for the copolymer was not recorded due to lack of solubility of the polymer in most of the organic solvents. Differential scanning calorimetric (DSC) analysis of the copolymer revealed a glass transition temperature (T$_g$) value of 30° C. and a melt temperature (T$_m$) value of 220° C. Elemental analysis indicated that the copolymer consisted of 44.74% F, 30.01% Cl, and 19.86% C, the ratio of % F/% Cl being 1.49.

Poly(CTFE-co-IA) Copolymer

Radical copolymerization of CTFE with IA in accordance with the present disclosure was carried out in a 600 mL Hastelloy Parr Autoclave equipped with a manometer, a rupture disk, and inner and outlet valves. The autoclave was purged with 30 bars of nitrogen pressure to prevent any leakage. A 20 mm Hg vacuum was then operated for 15 minutes. The following reactants were transferred into the Autoclave through a funnel. IA (4.20 g, 0.032 mol), TBPPi (2 mol %), and the solvent mixture (C$_4$H$_5$F$_5$: 200 mL, deionized water: 200 mL). After cooling the autoclave in liquid nitrogen/acetone mixture, CTFE (50.0 g, 429 mol, 93 mol %) was introduced by double weighing (i.e., the difference of weight before and after feeding the autoclave with CTFE). The reactor was heated up to 74° C. (P$_{max}$=10 bar). The reaction was stopped after 20 hours (ΔP=2 bar), and then the autoclave was cooled down to room temperature. After purging the volatiles, the product mixture provided 24.3 grams of poly(CTFE-co-IA) copolymer.

The product was analyzed by $^{19}$F and $^1$H NMR spectroscopy. The presence of CTFE was evidenced by a signal centered at −110 ppm in the $^{19}$F NMR spectrum (FIG. 4). In addition, the presence of CTFE-CTFE dyads was demonstrated by the signal centered at −127 ppm. The incorporation of IA was evidenced by the signals at 2.5 ppm and at 1.2 ppm in the $^1$H NMR spectrum (FIG. 5). The molar percentage of incorporated IA (12 mol %) was determined by the $^1$H and $^{19}$F NMR spectra using 2,5-dichlorobenzotrifluoride as the external standard. Differential scanning calorimetric (DSC) analysis of the copolymer revealed a glass transition temperature (T$_g$) value of 24° C. and a melt temperature (T$_m$) value of 160° C. Water vapor permeation analysis for a melt-pressed plaque at 37.8° C. and 100% relative humidity revealed a water intrusion rate of 0.40 grams/mil/m$^2$-day.

Poly(CTFE-co-MA) Copolymer

A 600 mL autoclave was employed for the free radical copolymerization of CTFE and maleic anhydride. The autoclave was pressurized with 30 bar of nitrogen for 1 hour to check for leaks. Then, a 0.004 mbar vacuum was operated for 30 min. Maleic anhydride in the amount of 17.2 grams was added to 40 grams of water to dissolve. The solution of MA in water was transferred into the autoclave (under vacuum). 3.62 grams of TBPPi was diluted in 20 grams of C$_4$H$_5$F$_5$. This solution of TBPPi in C$_4$H$_5$F$_5$ was transferred into the autoclave (under vacuum). Further, 340 grams of the solvent C$_4$H$_5$F$_5$ was transferred into autoclave (under vacuum). The valve of the autoclave was closed and frozen in an acetone/liquid nitrogen mixture. The autoclave was cooled down to −50° C. 107 grams of CTFE was then added. The autoclave was allowed to return to room temperature. The autoclave was then progressively heated to 74° C., by carrying out a heating profile that included a 2-minute equilibrium at 40° C., 50° C., 60° C., and 70° C. After 20 hours reaction time at 74° C., the autoclave was cooled to room temperature and then placed in an ice bath. The autoclave was then opened and vented. After evaporating the solvent, the reaction mixture was dissolved in chloroform, precipitated from cold pentane, and then isolated from cold isopropanol. The product was dried until constant weight to give 42.0 grams white powder (40% yield).

The presence of CTFE and MA was confirmed via $^{19}$F and $^1$H NMR spectra (FIGS. 6 and 7, respectively). The amount of MA incorporated in copolymer was calculated to be 17% from the $^1$H and $^{19}$F NMR spectra using 2,5-dichlorobenzotrifluoride as an external standard. The copolymer was dissolved in chloroform and the resulting solution was used to draw down a film on a PET substrate. The film that was opaque at room temperature became clear after heating to 200 C. Water vapor permeation analysis for a coated film (0.39 mil thickness) at 37.8° C. and 100% relative humidity revealed a water intrusion rate of 0.76 grams/mil/100 in$^2$-day.

Poly(CTFE-co-DHP) Copolymer (where DHP Stands for Dihydropyran)

A radical copolymerization of CTFE (90 mol % in the feed) with DHP initiated by 2 mol % tert-butyl peroxypivalate (TBPPi) was carried out at 74° C. in a 600 mL autoclave. The radical copolymerization produced 3 grams (5 wt. %) of a white-grey solid. The presence of CTFE was evidenced by the signals centered at −108 ppm (CF$_2$) and at −126 ppm (CFCl) in the $^{19}$F NMR spectrum (FIG. 8). In addition, the presence of CTFE-CTFE dyads was demonstrated by the signal centered at −128 ppm.

Poly(CTFE-Co-DG) Copolymer (where DG Stands for D-Glucal)

A radical copolymerization of CTFE (98 mol % in the feed) with D-glucal initiated by 2 mol % tertbutyl peroxypivalate (TBPPi) was carried out at 74° C. in a 600 mL autoclave. The radical copolymerization produced 8 grams (16 wt. %) of a yellow solid. The presence of CTFE was evidenced by the signals centered at −108 ppm ($CF_2$) and at −126 ppm (CFCl) in the $^{19}$F NMR spectrum (FIG. 9). In addition, the presence of CTFE-CTFE dyads was demonstrated by the signal centered at −128 ppm.

Poly(CTFE-Co-HPAc) Copolymer (where Stands for HPAc 2-Hydroxypropyl Acrylate)

The copolymer was prepared in a 1 liter-autoclave equipped with a manometer, a rupture disk, and inner and outlet valves was purged with 30 bars of nitrogen pressure to prevent any leakage. A 20 mm Hg vacuum was then operated for 15 minutes. The following reactants were added into the autoclave: 330 g deionized water, $K_2S_2O_8$ (1.4 grams in 56 grams of deionized water), $Na_2S_2O_5$ (2.18 grams in 60 grams of deionized water), $FeSO_4.7HO$ (0.76 grams in 10 mL of deionized water), $H_2SO_4$ (0.47 grams in 10 mL of deionized water) and 1.6 grams of 2-hydroxypropyl acrylate dissolved in 10 grams of deionized water. After cooling the autoclave in liquid nitrogen, CTFE (155 g, 1.33 mol, 99 mol %) was introduced by double weighing (i.e., the difference of weight before and after feeding the autoclave with CTFE). The reactor was heated up to 38° C. ($P_{max}$=10 bar). The reaction was stopped after 5 hours and then the autoclave was cooled down to room temperature. After purging the non-reacted CTFE, the product mixture was filtered-off, and the resulting solid was dried under high vacuum at 80° C. for 24 hours until constant weight to produce a white powder in 85% yield.

Water vapor permeation analysis for a melt-pressed plaque at 37.8° C. and 100% relative humidity revealed a water vapor transmission rate of 0.004 gram/100 in$^2$-day. The same melt-pressed plaque at 23° C. and 1% relative humidity exhibits an oxygen transmission rate of 2.1 cc/100 in$^2$-day.

As such, described herein are embodiments of fluoropolymers suitable for use in a wide variety of applications. The fluoropolymers are optically transparent, chemically inert, nonflammable, and plasticizer and stabilizer-free. The fluoropolymers exhibit superior moisture barrier properties. Further, the disclosed fluoropolymers thermoform easily using existing processing equipment and are able to adhere to other polymers While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope as set forth in the appended claims and their legal equivalents.

The invention claimed is:

1. A copolymer film comprising a copolymer that consists of a reaction product consisting of a first comonomer and a second comonomer, wherein:
    the first comonomer is a chlorofluoro olefin;
    the second comonomer is one of: D-glucal, glycerine carbonate vinyl ether, and 2-hydroxypropylacrylate; and
    the first and second comonomers are randomly copolymerized in the copolymer.

2. The copolymer film of claim 1, wherein the first comonomer is chlorotrifluoroethylene.

3. The copolymer film of claim 1, wherein the copolymer film is disposed on an article, and wherein the article is a pharmaceutical packaging product.

4. A coated substrate packaging film comprising:
    a substrate comprising polyvinyl chloride (PVC) or polyethylene terephthalate (PET) or polyethylene naphthalate (PEN) or polyimide; and
    a copolymer in the form of a copolymer film coated on at least one surface of the substrate, the copolymer consisting of a reaction product consisting of a first comonomer and a second comonomer, wherein the first comonomer is a chlorofluoro olefin, wherein the second comonomer is one of: D-glucal, glycerine carbonate vinyl ether, and 2-hydroxypropylacrylate, and wherein the first and second comonomers are randomly copolymerized in the copolymer.

5. The coated substrate of claim 4, wherein the first comonomer is chlorotrifluoroethylene.

6. The coated substrate of claim 4, wherein the copolymer is applied on at least two surfaces of the substrate.

7. A copolymer film comprising:
    a first comonomer that comprises chlorotrifluoroethylene (CTFE); and
    a second comonomer that comprises either D-glucal or glycerine carbonate vinyl ether,
    wherein the first and second comonomers are randomly copolymerized.

8. The copolymer film of claim 7, wherein the copolymer film is disposed on an article, and wherein the article is a pharmaceutical packaging product.

* * * * *